United States Patent

[11] 3,600,506

[72] Inventor William E. Richeson, Jr. Fort Wayne, Ind.
[21] Appl. No. 803,609
[22] Filed Mar. 3, 1969
[45] Patented Aug. 17, 1971
[73] Assignee The Magnavox Company Fort Wayne, Ind.

[54] BACKGROUND SENSING AND BLACK LEVEL SETTING CIRCUIT
10 Claims, 6 Drawing Figs.

[52] U.S. Cl. ........ 178/6 R, 178/71, 330/29, 330/139
[51] Int. Cl. ........ H04n 3/12
[50] Field of Search ........ 178/DIG. 16, 7.1, DIG. 26, 7.3 DC, 7.5 DC, 6; 330/29, 141

[56] References Cited
UNITED STATES PATENTS

| | | | |
|---|---|---|---|
| 3,192,483 | 6/1965 | Murray | 330/28 |
| 3,225,304 | 12/1965 | Richards | 330/28 |
| 3,244,997 | 4/1966 | Wruk | 330/141 |
| 3,515,803 | 6/1970 | Lorang | 178/7.3 |
| 2,760,008 | 8/1956 | Schade | 178/DIG. 16 |

*Primary Examiner*—Robert L. Griffin
*Assistant Examiner*—Donald E. Stout
*Attorney*—Richard T. Seeger

ABSTRACT: A background sensing and black level setting circuit for a facsimile transmission system is disclosed which linearly "stretches" the particular gray scale input of a document to yield an output having complete black to white gray scale characteristics. The circuit decreases its own gain rapidly when the lightest part of a document (exceeding some threshold) is scanned but increases its gain much more slowly when scanning darker areas so as to maintain its output for a document background as white. The circuit also serves to fix the darkest area of the document scanned as being black.

INVENTOR
WILLIAM E. RICHESON

BY Jeffers and Young
ATTORNEYS

INVENTOR
WILLIAM E. RICHESON
BY Jeffers and Young
ATTORNEYS

INVENTOR
WILLIAM E. RICHESON

BY Jeffers and Young
ATTORNEYS

BACKGROUND SENSING AND BLACK LEVEL SETTING CIRCUIT

This invention relates generally to facsimile systems and more particularly to an improved circuit for fixing the lightest and darkest areas of a scanned document as white and black respectively. In the facsimile transmission process it is highly desirable to make a copy with a white background regardless of the actual gray level of the background of the original document or to copy the document in such a way that the lightest part of the original document will be printed as being white. In establishing a white level the remaining video signals, that is, signals whose informational content represents information on the original document, range between the darkest level and this established lightest level called white. It is further desirable to preserve the linearity of the gray scale between these two limits while simultaneously causing the darkest level of the copy to be printed as black while the lightest level of the copy such as the background will be printed as white, thus optimizing the contrast of the copy that is being made.

Ordinarily in monochromatic copying systems that reproduce copy, the original of which had a colored or gray background, the reproduced copy will have a gray background. Whereas the original copy may have been easy to read because of contrasting colors the monochromatic copy of data on a gray background cannot be used or can be used only with great difficulty. Thus an original document which had red printing on a green background would produce gray printing on a gray background. In this example, it would be obviously desirable to establish the background as white and the printing as black. The prior art method of establishing the background level of white has been to alter the sensitivity of the scanning circuit until the lightest level meets a threshold after which this level of gain is maintained. Such systems require a short time constant for establishment and a long time constant of retention. There are two problems that arise. The darkest part of the copy will be made lighter when the circuitry is operating at an increased level of gain and the linearity of the gray scale may suffer because of the associated circuitry nonlinearities.

This invention makes it possible to make copy which has increased contrast between the dark markings and the background of the copy over that of the original document. This is accomplished by increasing the gain of the video circuitry until the lightest part of the copy reaches a predetermined value while not inducing any nonlinearities in the presented gray scale. The invention also causes the darkest part of the copy to be printed as black. The circuitry of the present invention begins at a high gain level but this level is cut back rapidly when the lightest part of the copy reaches or exceeds a specified threshold value (called white). Although the gain drops rapidly it increases slowly, that is, recovery of the circuit when the background becomes darker takes place much more slowly than the decreases in circuit gain when the background becomes light. This tends to create a stable background level rather than allowing the circuit to cycle as alternate light and dark areas are scanned.

In summary then, the prior art circuitry tended to introduce a nonlinearity into the gray scale of the copy in addition to its intended purpose of creating a copy white level dependent upon the lightest part of the item being copied. The prior art circuitry also tended to produce copies that were lighter than desirable in their darkest areas.

Accordingly it is one object of the present invention to provide facsimile circuitry which forces the background or lightest area of a scanned document to be recreated as white.

It is another object of the present invention to provide facsimile circuitry which causes the darkest areas of a scanned document to be reproduced as black.

It is a further object of the present invention to provide facsimile circuitry which does not distort the gray scale of an input document.

It is another object of the present invention to provide a facsimile circuit which will reproduce copy whose gray scale will have black and white as its limits even though the original document had neither a white background nor black lettering so as to maximize the contrast ratio of the reproduced copy.

These and other objects and advantages of the present invention will become more apparent from the following detailed disclosure read in conjunction with the drawings in which.

Figure 4B:
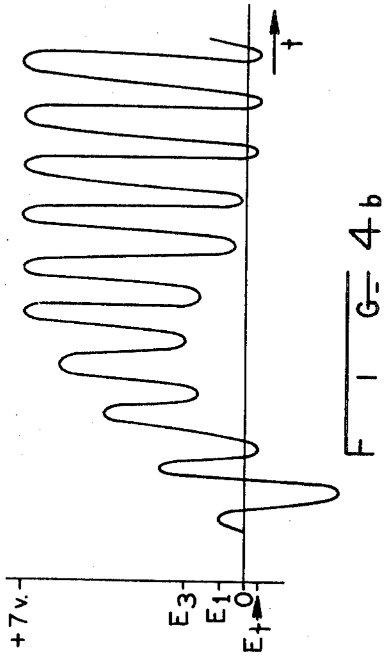
Figure 5:
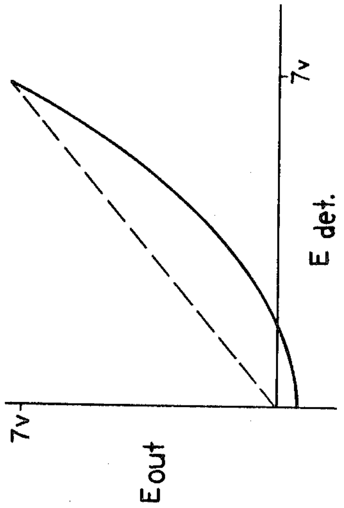
Figure 4A:
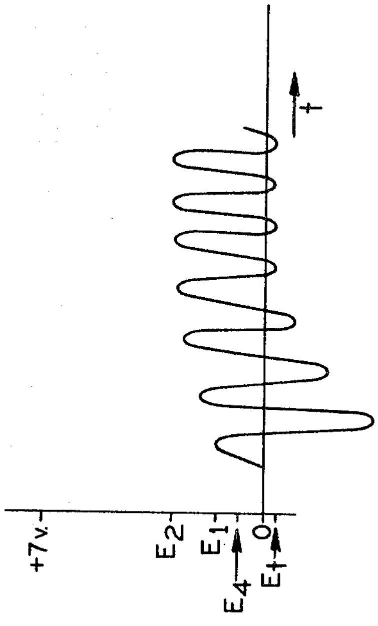

FIGS. 4*a* and 4*b* illustrate the response characteristics as a function of time of the prior art and improved circuit respectively;

FIG. 5 is a graph comparing the transfer functions of the prior art device and the present invention.

Figure 1:
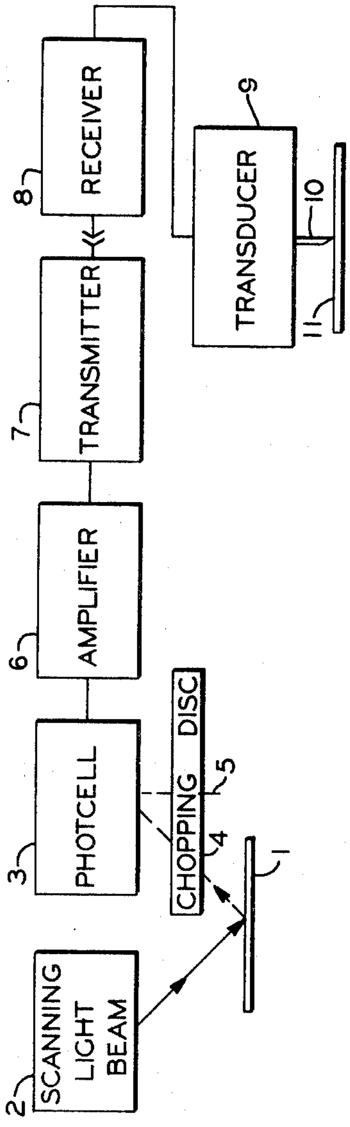
FIG. 1 is a block diagram of a facsimile system which may incorporate the present invention.

FIG. 1 shows in general block diagram form a facsimile system which could provide a suitable environment for the present invention. A source document 1 is scanned with a beam of light from a scanner 2 and light reflected from the document is reviewed by a photo cell 3. In the system illustrated a disc 4 which is rotating about its axis 5 has notches cut in its periphery and act as a chopper on the light reflected from the scanned document so that an alternating current signal is presented to the photo cell 3 rather than a DC signal. This simplifies signal processing as is more fully explained in copending application Ser. No. 436,504, filed Mar. 2, 1965 by Reese et al. and entitled "Optical System." This application has been abandoned in favor of a continuation-in-part application now U.S. Pat. No. 3,475,553 issued Oct. 28, 1969.

An amplifier 6 amplifies the signal from photo cell 3 and sends the thus amplified signal to transmitter 7. This signal is then transmitted to the receiver 8 by means of telephone lines, radio waves or other means. After the received signal is suitably processed, it is fed to the transducer 9 which actuates a stylus 10 so that the informational content on the original document 1 is reproduced as a copy 11. A system which is amenable to the teachings of the present invention and which transmits through conventional telephone handsets and telephone lines is illustrated in more detail in copending application Ser. No. 669,315, filed Sept. 20, 1967 by Crane et al. and entitled "Facsimile Systems." It is understood of course that this invention may be used in any system where there is a background which requires adjustment while maintaining full contrast and it is particularly useful in conjunction with the teachings of copending application Ser. No. 803,612 filed Mar. 3, 1969 by Richeson and Dreisbach entitled "Improved Facsimile System" to provide substantially improved system operation.

Figure 2:
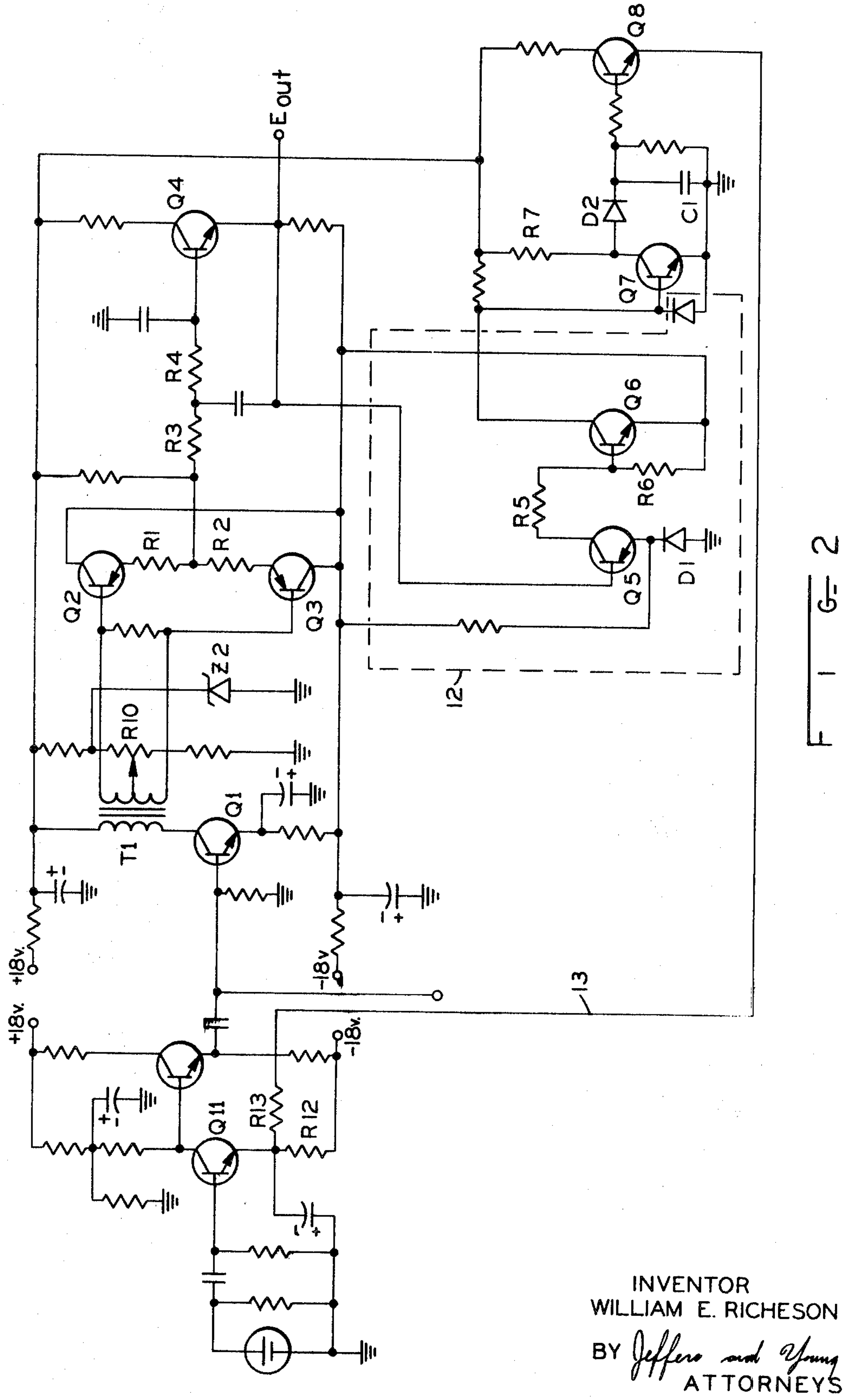
FIG. 2 is a schematic diagram of the transmitter amplifier of FIG. 1 incorporating the present invention.

Turning now to FIG. 2, there is shown a schematic diagram of the amplifier 6 of FIG. 1 incorporating the present invention. That portion of the schematic diagram outside of the dotted line 12 is basically the amplifier circuit known in the prior art and the specific subject of application Ser. No. 649,506, filed June 28, 1967 by M. M. Lorang and entitled "-Contrast Range Control." This prior art circuit also included a potentiometer and two diodes not shown whose function has been supplanted by the present invention.

The operation of the prior art circuit was unsatisfactory in that the base circuit of Q4 was varyingly loaded thereby reducing the gain of Q4 by the voltage divider R1, R2, R3 and R4. Due to this varying loading of the base circuit of Q4 the sensitivity of the circuit was diminished as the base of Q4 approached a negative value. This caused the transfer function of the circuit from the detector Q2, Q3 to the output voltage $E_{out}$ to be as shown in FIG. 5. In this figure pure black is represented by the 7-volt potential and pure white is represented by 0-volt potential. As is readily seen the gray scale was altered in the region of the light grays just above the established whitest portion of the copy being made. Ideally, this function would be linear as represented by the dotted line in FIG. 5. It is also noteworthy that loading the base of transistor Q4 increases the rolloff frequency of the active low pass filter which consists of transistor Q4 and its associated components thereby allowing more rectified carrier signal to be included in the output of the circuit. This active RC Filter is more fully discussed in the aforementioned patent to Lorang 3,515,803. This rectified carrier acts as a source of interference which can damage the copy that is being made.

The improved circuit shown in FIG. 2 obviates the above difficulties. The output line is at a low impedance level since Q4 is connected as an emitter follower. Transistor Q5 samples the voltage level of this line and has its threshold determined by the forward biased diode D1. The transistor Q5 conducts when the base of the transistor reaches a negative going threshold. Conduction of Q5 causes current to flow through the voltage divider R5, R6 which in turn causes Q6 to conduct. The negative going collector of Q6 causes the normally conducting transistor Q7 to conduct less. If the collector of Q7 rises well above the stored potential of the capacitor C1 then diode D2 conducts thereby further charging the capacitor C1 by current flowing through the resistor R7 from the positive 18-volt supply. The dissimilar charging and discharging rates of C1 are more fully discussed in the aforementioned Lorang patent. The emitter follower Q8 detects this increase in the voltage on C1 and in turn causes the gain of the transistor Q11 to be reduced by reducing the collector current of Q11. This reduces the gain of the photo cell amplifier which in turn feeds the carrier detector and low pass filter emitter follower transistor Q4.

The following specific example of the operation of the circuit of FIG. 2 may help to clarify its function. Suppose that the voltage on the output terminal $E_{out}$ is below the threshold value $E_+$ of FIGS. 4*a* and 4*b*. This is a slightly negative voltage and under these circumstances the base to emitter biasing of the transistor Q5 will be such that the conduction of Q5 will increase. An increased conduction by Q5 increases the conduction of Q6 because of an increased current flow in R6. Increased current in Q6 lowers the potential at the base of Q7 causing it to conduct less. This, of course, decreases the voltage drop across R7 which in turn allows the capacitor C1 to take on an increased charge. An increase in the charge on C1 raises the potential of the base of transistor Q8 causing an increased current flow in that transistor. A higher current in Q8 raises the potential at the emitter of Q11 thus diminishing its emitter current which as noted earlier lowers the gain of the transistor stage Q11. Lower gain in Q11 coupled with the inversion which takes place due to the transistor pair Q2, Q3 serves to raise the potential at the output terminal back above the threshold value $E_+$.

Figure 3:
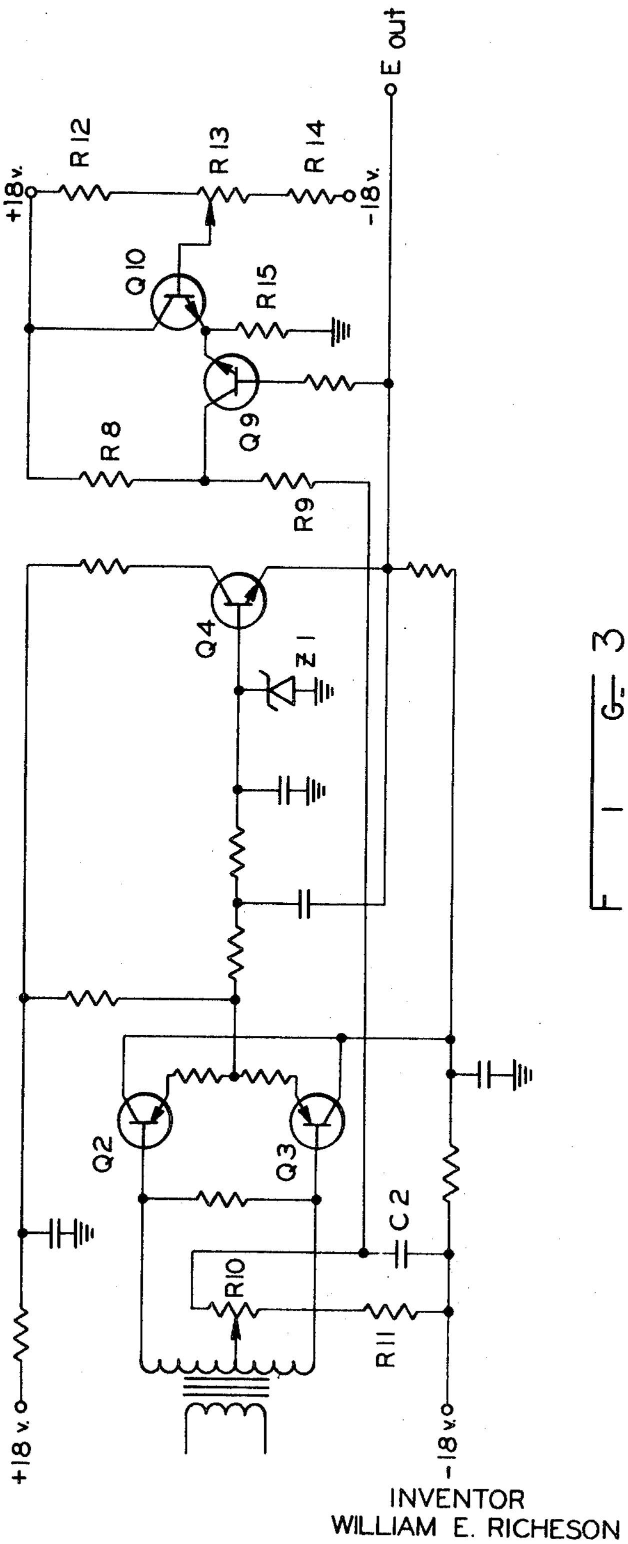
FIG. 3 is a schematic diagram of an alternative form for a portion of FIG. 2.

In attempting to cause the darkest part of a copy to be printed as black and thus achieve maximum contrast for printed or line copy, two approaches are feasible. First a positive threshold value can be set for the value of $E_{out}$ beyond which the output will be adjusted to 7-volts or full black. This could be achieved by processing the signal $E_{out}$ through a Schmitt trigger or similar circuit that would produce zero output for signals below the threshold and a 7-volt output for signals above that threshold. A second approach would be to "stretch" the available contrast between the darkest and lightest part of the copy. One method of achieving this stretching, would be to modify the value of the voltage appearing on the secondary tap of the transformer T1 so as to assure a maximum level of $E_{out}$ at 7 volts even though the darkest shade of gray in the original copy is not full black. The modification of this potential may be achieved by the circuit of FIG. 3. Transistor Q10 in conjunction with R12, R13 and R14 establishes the potential across R15 and hence across the emitter of Q9. When black copy is being scanned $E_{out}$ will be plus 7 volts which causes Q9 to barely conduct. The current through R8, R9, R10 and R11 causes the charge on capacitor C2 to be that which is appropriate for a 7-volt $E_{out}$. Before the scanning process began, $E_{out}$ was 7 volts and the amplifier had its gain set at a maximum. When copy is being run that has no element that is fully black, the means conduction level of Q9 will be negligible and the means current through R9 is high which causes the wiper of R10 to be more positive which in turn causes $E_{out}$ to approach 7 volts for this level of maximum gray on a given copy. Zener diode Z1 or some such standard is used to prevent $E_{out}$ from transiently rising above the 7-volt level.

The prior art circuit which is partially depicted in FIG. 2 and is fully disclosed in the aforementioned Ser. No. 479,506 operates basically as follows. Transistor Q11 is a gain controlled amplifier having its gain directly proportional to its DC emitter current. The initial DC emitter current of Q11 is set by the resistor R12. When an error voltage appears on the feedback line 13 it will, by virtue of a change in potential on R13, remove some of the emitter current from Q11 thus reducing the gain of Q11. Transistors Q1, Q2, and Q3 perform the function of a negative detector operation on the signal, that is they take the difference between the most black reference and the absolute value of the baseband or photo cell output signal. The black reference signal is supplied by the regulated voltage across the Zener diode Z2. Transistor Q4 and its associated components filter and buffer the output of transistors Q2 and Q3 and form an active RC filter. The operation of this prior art circuit without benefit of the present invention may be best understood by referring to FIG. 4*a*. Initially, the amplifier has maximum gain and $E_1$ is signal created by scanning the darkest mark on the original document. Once the background has been reestablished by reducing the gain of the amplifier and thus after inversion increasing the voltage output, the darkest gray level of the scanned document reaches the value $E_2$. This however does not cause black to be printed at the receiver. When the document being scanned has a dark background with a lighter gray print, the level $E_2$ which is the darkest gray mark on the copy is reproduced at the receiver as gray and the print is reproduced as white, such a copy is particularly difficult to read.

When the approach of using the prior art circuit to drive a Schmitt trigger or similar circuit so as to produce zero for signals below a threshold and 7 volts for signals above that threshold is used, every gray level above that threshold is printed as black. When the machine begins to function, $E_{out}$ is 7 volts and the gain of the amplifier is great. At this time, the light portions of the copy exceed the given threshold causing the gain to be reduced. As the gain is reduced the resultant voltage from the darker portions of the copy approach $E_2$. Since the signal $E_{out}$ is for this approach the output of a Schmitt like circuit all signals greater than $E_4$ becomes 7 volts or fully black and the resultant copy becomes one of full black on a full white background.

When the alternate approach of stretching the gray scale is used, the circuit performs as is illustrated in FIG. 4*b*. Again the circuit starts with $E_{out}$ equal to 7 volts. Upon running a copy that has light gray detail on a light gray background the initial maximum value of $E_1$ is small and Q9 remains in its nonconducting state. With Q9 nonconducting current flow through R8 and R9 begins to charge the capacitor C2. C2 will continue charging until this maximum gray level scanned creates an $E_{out}$ which is 7 volts at which time the charging current flowing in R9 is reduced to a value sufficient to maintain this voltage across the capacitor C2 constant so as to produce a 7-volt output.

Due to the fact that the initial light background reduces the gain, the initial swing between $E_1$ and $E_{out}$ will be reduced to 7 minus $E_3$ and the automatic background control threshold $E_t$ is no longer reached. This causes the gain of the amplifier to begin increasing and the voltage corresponding to the lightest detail $E_3$ converges to $E_t$ while the maximum level of gray on a given copy continues to be maintained at 7 volts or black. Thus, the copy that is made will be full black on a white background. This is a continuous process so that the gray scale of a scanned document is linearly stretched to maximize the contrast ratio so as to yield a full range of black to white even through the original document does not contain this full range.

In summary then, the potential $E_+$ shown on FIGS. 4*a* and 4*b* is limited by the diode D1 of FIG. 2, however, reaching this potential is controlled by the action of the transistor Q5. The modifications illustrated in the circuit of FIG. 3 have the response characteristics illustrated in FIG. 4*b* and function to stretch the gray scale of an original document being scanned so as to produce an output which varies from black to white although the original document may just vary between two shades of gray. This stretching function is linear so that any shading in the original document will be proportionately shaded in the output. The circuit of FIG. 2 has the original response characteristics shown in FIG. 4*a* and this response characteristic is used to trigger a bilevel device such as a Schmitt trigger or some sort of saturating amplifier. Thus, those portions of the FIG. 4*a* waveform which exceed a specified threshold $E_4$ will cause this bilevel output to be high for example at 7 volts and all values below the threshold will cause the bilevel device to have a low output, for example, 0 volts.

While the invention has been described in reference to a specific embodiment it is understood that modifications and adaptations will present themselves to persons having ordinary skill in the art and accordingly the invention is to be limited only by the scope of the appended claims.

What I claim is:

1. In a facsimile system variable gain amplifier having maximum and minimum voltage output levels which represent the signal magnitude necessary for reproducing black and white on a copy and having input voltage levels which are representative of the lightest and darkest areas of a scanned document and which may be less than the magnitude necessary for reproducing said maximum and minimum output voltage levels, an improved black and white level setting circuit comprising:

- amplifier means for initially amplifying the input signal at a first gain level to produce an output signal with a dynamic range which is less than the minimum and maximum voltage levels necessary for reproducing black and white on a copy; and
- gain control means responsive to the amplifier output signal for subsequently increasing the gain of said amplifier means to produce an output signal with a dynamic range which corresponds to the minimum and maximum voltage output levels of said amplifier necessary for reproducing black and white on a copy.

2. In a facsimile system variable gain amplifier having maximum and minimum voltage output levels which represent the signal magnitude necessary for reproducing black and white on a copy and having input voltage levels which are representative of the lightest and darkest areas of a scanned document and which may be less than the magnitude necessary for reproducing said maximum and minimum output voltage levels, an improved black and white level setting circuit comprising:

- amplifier means for initially amplifying the input signal at a first gain level to produce an output signal which is less than the maximum voltage level;
- means for shifting said amplifier output so that the maximum output signal values correspond to said maximum voltage level;
- gain control means responsive to the amplifier output signal for subsequently increasing the gain of said amplifier means to produce an output signal the minimum values of which correspond to the minimum output level of said amplifier; and
- said minimum and maximum voltage levels are of the amplitude necessary to reproduce black and white on a copy.

3. The improvement of claim 1 wherein said gain control means comprises a nonlinear feedback circuit.

4. The improvement of claim 2 wherein said gain control means comprises a nonlinear feedback circuit.

5. The improvement of claim 2 wherein said means for shifting and said gain control means are effective contemporaneously.

6. The improvement of claim 5 wherein the time required to shift said amplifier output to attain said maximum voltage level is $T_1$ and the time required to attain said minimum voltage output level is $T_2$ and $T_2 > T_1$.

7. The improvement of claim 1 wherein portions intermediate said darkest and lightest portions of said scanned document are printed proportionately intermediate to black and white.

8. The improvement of claim 2 wherein portions intermediate said darkest and lightest portions of said scanned document are printed proportionately intermediate to black and white.

9. The improvement of claim 1 wherein the maximum voltage output level corresponds to black and wherein the relative maximum voltage input level corresponds to the relatively lightest area of the scanned document.

10. The improvement of claim 2 wherein the maximum voltage output level corresponds to black and wherein the relative maximum voltage input level corresponds to the relatively lightest area of the scanned document.